J. LEDWINKA.
ASSEMBLING MACHINE.
APPLICATION FILED APR. 14, 1915.
1,216,466.
Patented Feb. 20, 1917.
5 SHEETS—SHEET 2.
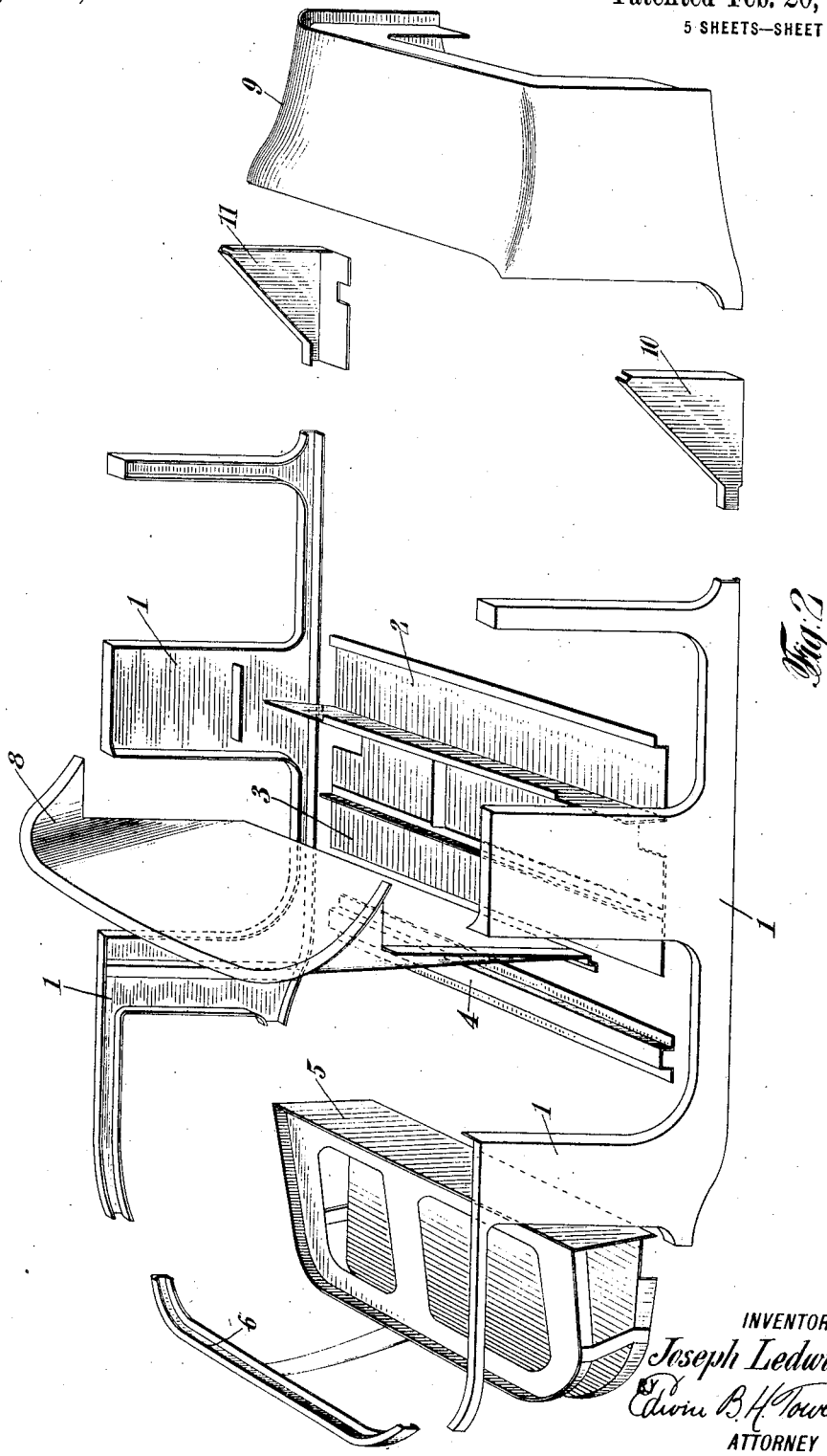
INVENTOR
Joseph Ledwinka
Edwin B. H. Tower Jr.
ATTORNEY J. LEDWINKA.
ASSEMBLING MACHINE.
APPLICATION FILED APR. 14, 1915.
1,216,466.
Patented Feb. 20, 1917.
5 SHEETS—SHEET 3.
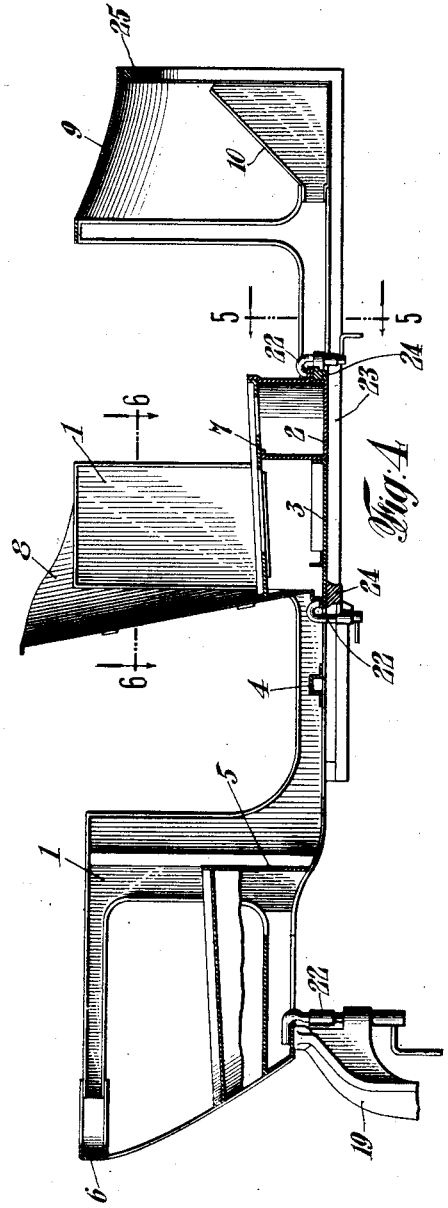
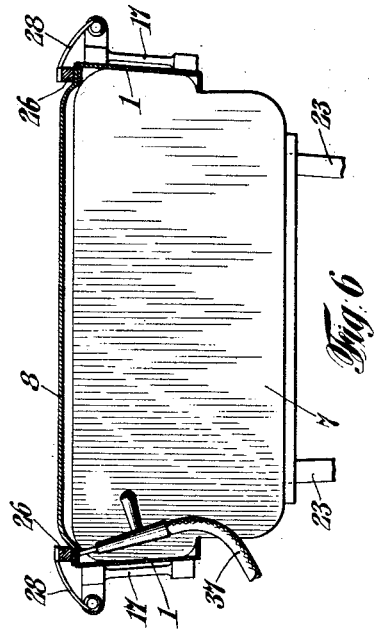
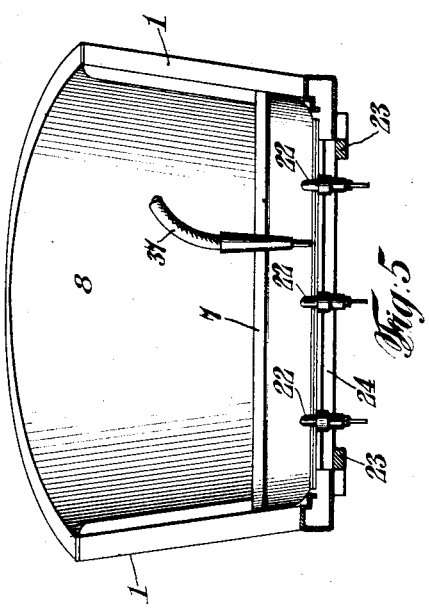
INVENTOR
Joseph Ledwinka
By Edwin B. H. Tower Jr.
ATTORNEY

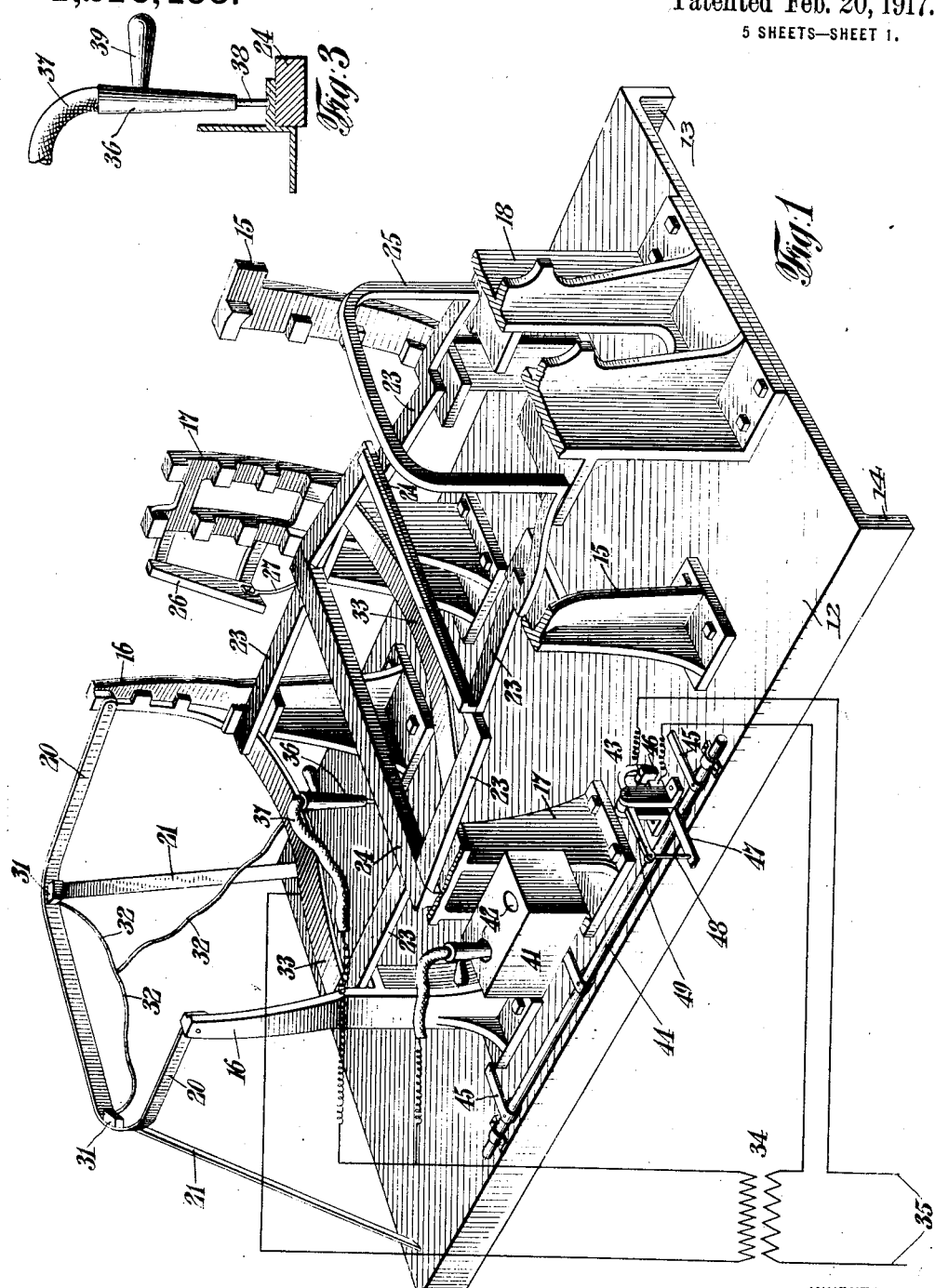

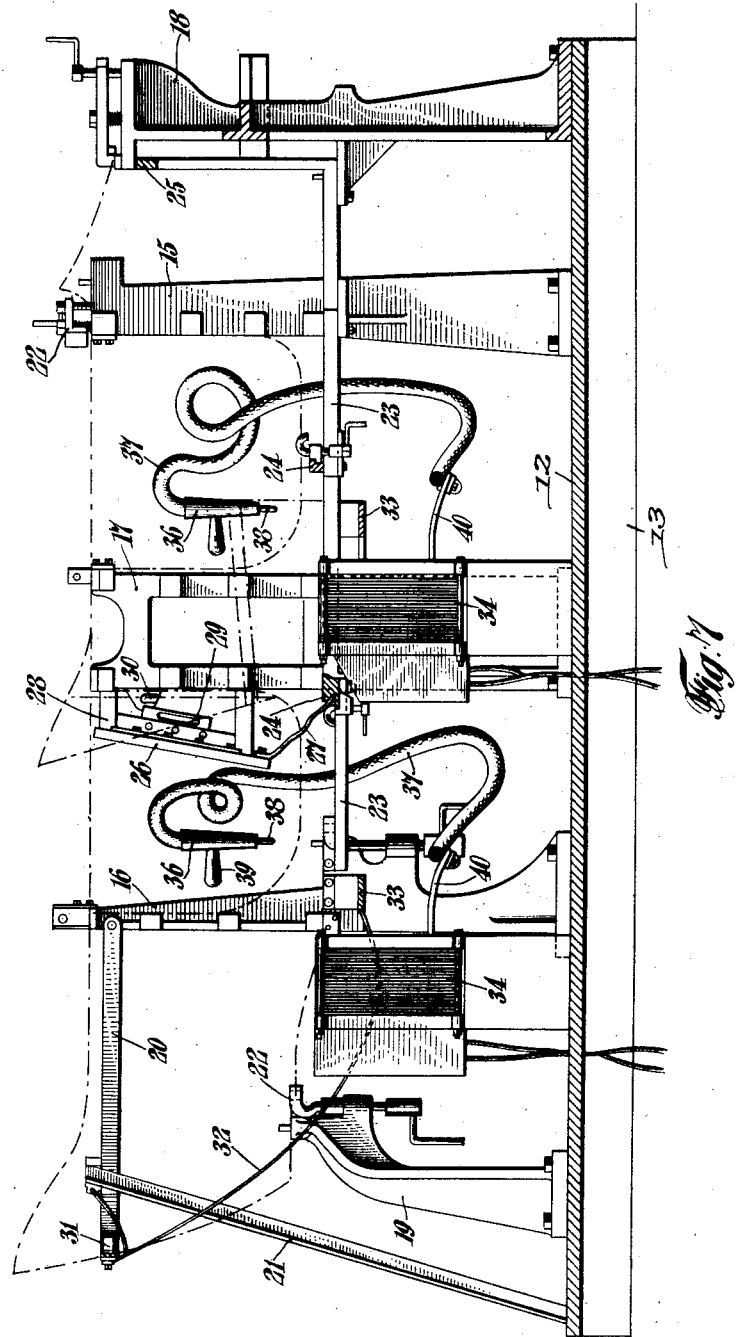

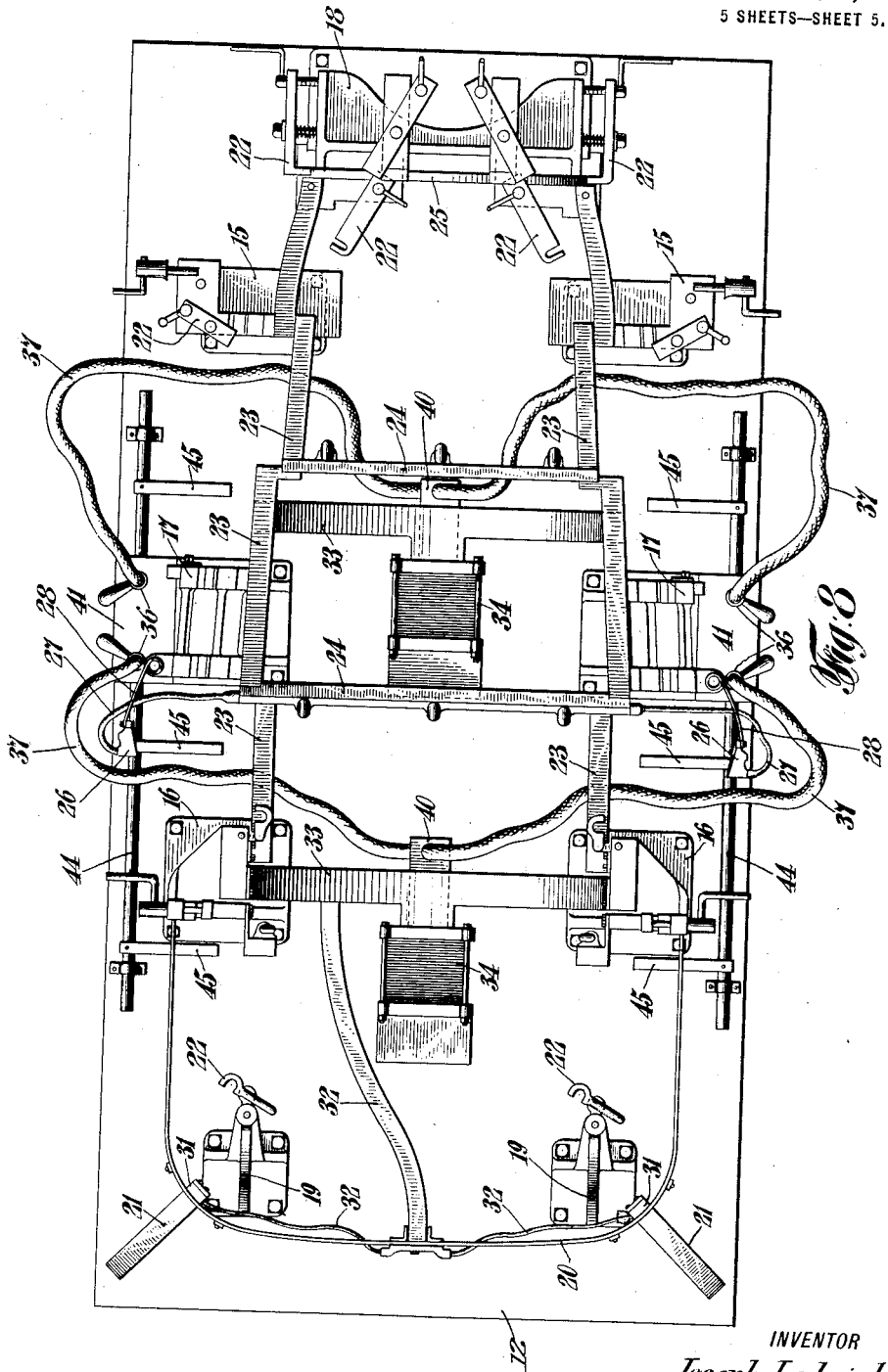

UNITED STATES PATENT OFFICE.

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

ASSEMBLING-MACHINE.

1,216,466.   Specification of Letters Patent.   Patented Feb. 20, 1917.

Application filed April 14, 1915. Serial No. 21,226.

*To all whom it may concern:*

Be it known that I, JOSEPH LEDWINKA, a citizen of the United States, residing at Philadelphia, in the county of Philadelphia and State of Pennsylvania, have invented new and useful Improvements in Assembling-Machines, of which the following is a specification.

This invention relates to assembling machines.

It is particularly applicable to machines for assembling automobile bodies.

Metal automobile bodies comprise in general a plurality of members, including sides, cross-braces, a shroud, tonneau, seat pans and the like. It is important that these parts be accurately assembled and firmly united. Automobile bodies and the like are usually of such size and shape that they must remain in stationary position while their members are being assembled and united. The problem has been to accurately and expeditiously assemble and unite these structures and to this end the present invention has been devised.

An object of the present invention is to provide a machine in which a multiplicity of metal members may be assembled and welded together.

Another object is to provide a machine in which an automobile body may be readily assembled and its members united.

Another object is to provide a machine for accurately and expeditiously assembling and welding automobile bodies.

Another object is to provide a machine in which the members constituting an automobile body may be readily welded together while supported in stationary assembled position.

Another object is to provide a machine for welding the members of an automobile body together at various points without moving both welding electrodes for each weld.

A further object is to provide a machine for assembling and welding automobile bodies which gives ready access to the body at all times.

Various other objects and advantages of the invention will hereinafter appear.

In accordance with the invention, a structure is provided for receiving and supporting in proper position the members constituting the automobile body and means are associated therewith for welding the members together.

While the invention as herein set forth is particularly adapted for assembling automobile bodies, it should be understood that machines embodying the invention may be employed to assemble other structures.

The accompanying drawings illustrate an assembling machine embodying the invention.

The views are as follows:

Figure 1 is a perspective view of the assembling machine with some of the details of the machine omitted.

Fig. 2 is a separated perspective view of a pressed steel automobile body.

Fig. 3 is a view illustrating the manner in which the members are welded together.

Fig. 4 is a longitudinal, vertical section through the assembling machine, showing automobile body in position.

Fig. 5 is a vertical section on the line 5—5 of Fig. 4, looking in the direction of the arrows.

Fig. 6 is a horizontal section on the line 6—6, showing the electrodes engaging a vertical joint between the members.

Fig. 7 is a longitudinal section of the machine.

Fig. 8 is a plan view thereof.

An automobile body which may be assembled in the machine herein disclosed is shown in Fig. 2. It has two side members 1, joined together by a plurality of cross members, such as cross-braces 2, 3 and 4, a rear seat pan 5, a tonneau support 6, a front seat pan 7 (see Fig. 4), a front seat back 8, a shroud 9 and the like. Toe board supports 10 and 11 are provided which are adapted to be attached to the sides and to the shroud. It is, of course, understood that various other members may be added as required and that the shape and number of the members may be varied to suit different body designs.

The members constituting the automobile body are preferably stamped or pressed out of sheet metal. They are formed with suitable flanges, which abut or overlap, so that the members may be electrically welded together.

The machine for assembling a body of this type comprises, in general, a supporting structure, form or cradle for receiving and supporting the automobile body members in assembled relation, relatively stationary electrodes adapted to engage the members adjacent the joints between the same, and movable electrodes adapted to be brought into engagement with the members to weld them together.

The supporting structure is more particularly shown in Figs. 1 and 7. It is mounted upon a suitable base 12 which in this instance comprises a casting provided with depending flanges 13 and 14. Mounted upon the base are a pair of front standards 15, a pair of rear standards 16, a pair of central standards 17, a front end standard 18 and a pair of rear end standards 19. The rear standards 16 are provided with an extension 20, supported by suitable braces 21, attached to the base 14.

The standards are shaped and located to receive the body members and support them in proper assembled position. The sides of the body are supported adjacent the door openings by the standards 15, 16 and 17. The body is thus firmly supported adjacent the door posts and at the same time the interior thereof is readily accessible. The rear end standards 19 are provided with pins which coöperate with holes in the rear seat pan 5, to insure that the standards will support the pan in its correct position. The extension 20 projecting from the rear standards 16 surrounds the outside of the tonneau support 6, thereby serving to support the same in proper relation to the sides. The location and shape of the standards may be varied to adapt the machine to bodies of different designs and for structures of other shapes. In order to insure that the members are firmly held in accurate position, the standards are provided with suitable clamps 22, located at convenient points, whereby the members may be positively forced to and held in proper position. It will thus be seen that a supporting structure or cradle is formed which is adapted to receive the automobile body members and accurately position and support them in assembled relation.

The stationary electrode is made of copper or other good conducting material and it is of sufficient cross-sectional area to carry a heavy current without appreciable voltage drop. It comprises in general a plurality of bars, which extend along the joints between the body members, the bars being adapted to electrically contact one side of the joints.

The electrode has side bars 23, supported along the longitudinal flanges on the body sides by the standards 15, 16, 17 and 18. The side bars 23 are joined by cross-bars 24, which are in juxtaposition to certain of the cross-members of the body. The front end standard 18 supports a U-shaped bar 25, which is in electrical contact with the side bars 23 and which is adapted to engage the shroud 9. The central standards carry movable bars 26, which are adapted to be clamped in contact with the vertical joints between the front seat back 8 and the side members 1, as shown in Fig. 6. The bars 26 are electrically connected to the side bars 23 by conductors 27. The movable bars 26 are attached to frames 28, shown more particularly in Fig. 7, which are pivoted to the central standards 17. Each frame has a slotted member 29 coöperating with a screw bolt 30, whereby the frames may be firmly clamped in position with the bars 26 in contact with the vertical joints between the seat back and the sides. The extension 20, projecting from the rear standards 16, supports a pair of copper blocks 31, which are adapted to engage the joint between the tonneau support 8 and the sides. These blocks are connected to the main portion of the electrode by conductors 32. It will thus be seen that the conducting bars which make up the stationary electrode are electrically connected together, so that they constitute in effect a single electrode. Of course, the shape, number and location of the bars may be varied to suit the requirements of the various structures which are to be assembled. It should also be understood that the conducting bars may be electrically separate themselves and each may be connected to the same side of an electric circuit, in which case the bars constitute a plurality of stationary electrodes of the same polarity.

The stationary electrode is arranged to be electrically energized as follows:

The side bars 23 are joined by heavy copper conductors 33, each of which is directly connected to one side of the secondary of a transformer 34. The transformers 34 are supported on the base 14 in close proximity to conductors 33, so that the connections between the same may be as short as possible and the voltage drop thereby reduced to a minimum. Of course, the transformers may be located at other points and be connected to the electrodes by conductors of suitable length and size. The transformer primaries are connected to supply mains 35, which are energized by any suitable source of electrical energy. The ratio of transformation is such that the secondaries supply a heavy current of low voltage.

The movable electrodes each comprise in general a welding terminal 36 and a flexible cable 37. The welding terminals are provided with a cold drawn copper plug 38, removably secured in the end thereof to form a welding tip. Each terminal has a handle 39, by means of which pressure may be exerted at the time a weld is made.

The flexible cables 37 are connected to the terminals 40 of the transformers. The terminals 40 are of opposite polarity to the terminals which are connected to the stationary electrode. The cables are of sufficient length to allow the welding terminals 36 to be brought into engagement with the body members at a multiplicity of points. The fields of operation of the terminals overlap, so that all parts of the body may be reached. Of course, each cable may be made long enough to enable each electrode to reach any part of the body, if desired. The number of movable electrodes may be varied to suit the requirements of different conditions. Each of the flexible cables is thoroughly insulated throughout its length to prevent short-circuits in case the cable is accidentally brought into contact with a member of opposite polarity.

When the movable electrodes are not in use, they may be placed in suitable insulating receptacles comprising, in this instance, wooden blocks 41, having holes 42 therein for receiving the terminals. These blocks may be located at any convenient point on the machine.

A switch 43 is located in the primary circuit of the transformers, said switch being biased to open position so that the electrodes are normally deënergized. The switch may be located at any convenient point and it may be of any suitable type. The switch is illustrated more particularly in Fig. 1. It is mounted upon the base 12 and has an operating shaft 44, provided with a plurality of foot levers 45, by means of which the shaft may be operated from several different points. The shaft operates the switch contact 46, by means of levers 47, 48 and 49, so that when the operator presses one of the foot levers 45 the switch is closed, thereby energizing the transformers and the electrodes.

The operation of the machine is as follows:

The sides 1 of the automobile body are first placed in the machine and clamped in position. The cross-braces, seat pans and other parts are then placed in proper assembled relation. The movable bars 26 of stationary electrode 12 are clamped in contact with the joints between the front seat back and the sides, as shown in Fig. 6. The various clamps 22 are adjusted to hold the members in position.

The automobile body members are thus supported and held in accurate assembled position. The conducting bars and blocks constituting the stationary electrode are either in actual electrical contact with the joints between the members or they are located immediately adjacent thereto, so that when pressure is brought to bear upon the joints, the electrode engages the same.

The members are welded together by closing the switch 43 and, bringing one of the movable electrodes into contact with a joint to be welded, pressure being exerted on the electrode as it engages the joint. This operation completes a circuit from the movable electrode through the members to the stationary electrode. The current quickly brings the members to a welding heat at the spot where the circuit is completed and they are fused or welded together at this point. This is illustrated more particularly in Fig. 3. Fig. 6 illustrates the manner in which the vertical seam between the front seat back and the body sides is welded.

After a weld has been completed at one point on a joint, the operation is repeated at a plurality of points along each joint until the whole body is united into an integral structure. By having more than one movable electrode, several operators may work on the same body at the same time.

Welds may be made at points on the body which are removed from the stationary electrode when the body parts are of sufficient sectional area to carry the current from the stationary electrode to the point where the weld is to be made. In such cases, the current flows from the electrode through the body to the point where the electrode contacts the same.

It will thus be seen that a machine has been provided by means of which an automobile body, or the like, may be accurately and expeditiously assembled. The body parts are held in accurate relative position during the assembling operation, so that uniform, well-alined bodies are produced. The body remains in a stationary position during the assembly and accordingly no time and labor is consumed in moving it about. It is also readily accessible, so that all parts thereof may be easily reached with the movable electrodes. Several operators may weld different parts of the body at the same time, thereby expediting the process of assembly. The stationary electrodes extend along the joints to be welded and they are ordinarily rigidly supported. Accordingly, when pressure is brought to bear upon the joint by one of the movable electrodes, good electrical contact is secured. Furthermore, no time is wasted in locating an exact spot where the movable electrode must engage the joint before a circuit can be completed, since the stationary electrodes extend along substantially one entire side of the joints. A welding operation, from the operator's standpoint, merely involves grasping one of the movable electrodes and pressing it into engagement with a joint at any point where a weld is desired, at the same time closing the switch by pressing on one of the foot levers.

An automobile body may accordingly be accurately and efficiently assembled with a minimum amount of labor and in a short period of time.

It should be understood that the structure shown is for the purposes of illustration only and that various other structures may be devised which embody the invention and which come within the spirit and scope of the appended claims.

Having described my invention, what I claim and desire to secure by Letters Patent is:

1. An assembling machine comprising a form to receive the members constituting a complete article and hold them in final assembled position, and means to weld the members together to produce the complete article.

2. An assembling machine for automobile bodies comprising a form to receive and hold all of the members of a complete automobile body, and means to weld said members together to produce the complete body.

3. An assembling machine comprising a form to receive and hold all of the members of a complete article, and means to weld said members together to produce the complete article.

4. An assembling machine comprising a form to receive the members constituting a complete article and hold them in final assembled position, and means to weld said members together comprising a stationary electrode adapted to contact with said members along the joints between the same and a movable electrode adapted to engage the joints between the members to complete a circuit therethrough to unite said members into the complete article.

5. An assembling machine comprising a form to receive the members constituting a complete article and hold them in final assembled position, a stationary electrode adapted to contact with said members along the joints between the same, and a plurality of independently movable electrodes adapted to engage the members at any point along the joints whereby different parts of said members may be welded together at the same time.

6. An assembling machine comprising a form to receive the members constituting a complete article and hold them in final assembled position, a stationary electrode adapted to contact with said members adjacent the joints between the same, and an electrode freely movable in any plane to engage said members at any point to complete an electric circuit therethrough to the stationary electrode to weld said members together to produce the complete article.

7. An assembling machine comprising a form to receive the members constituting a complete article and hold them in final assembled position, and means coöperating with said form to weld said members together to produce the complete article.

8. An assembling machine comprising a form to receive the members constituting a complete article and hold them in final assembled position, and a portable electrode coöperating with said form to weld said members together to produce the complete article.

9. An assembling machine comprising a form at least a part of which constitutes a stationary electrode, said form serving to receive the members constituting a complete article and hold them in final assembled position, and means coöperating with said stationary electrode to weld said members together to produce the complete article.

10. An assembling machine comprising a form at least a part of which constitutes a stationary electrode, said form serving to receive the members constituting a complete article and hold them in final assembled position, and a portable electrode coöperating with said stationary electrode to weld said members together to produce the complete article.

11. An assembling machine comprising a form to receive the members constituting a complete article and hold them in final assembled position, portions of said form constituting a stationary electrode shaped to abut said members along the joints between the same, and a portable electrode coöperating with said stationary electrode to weld said joints together.

12. An assembling machine comprising a form designed and shaped to receive the members constituting a complete article, at least a portion of said form serving as a stationary electrode of low resistance, and a portable electrode coöperating with said stationary electrode to weld said members together.

13. An assembling machine for automobile bodies comprising a form to receive the members constituting the complete body and hold them in final assembled position, portions of said form constituting a stationary electrode of low resistance shaped to abut said members along the joints between the same and a portable electrode coöperating with said stationary electrode to weld said joints together.

14. A machine for assembling automobile bodies having side members provided with door openings therein, comprising pairs of standards adapted to engage the side members adjacent the door openings so as to position and support said members in assembled relation and leave the interior of the body readily accessible, and means for uniting the automobile body members together while supported in assembled relation.

15. A machine for assembling automobile bodies having side members provided with door openings therein, comprising pairs of standards adapted to engage the side members adjacent the door openings so as to position and support said members in assembled relation and leave the interior of the body readily accessible, and means for welding the automobile body members together while supported in assembled relation.

16. A machine for assembling automobile bodies having side members provided with door openings therein, comprising standards adapted to engage the side members adjacent the door openings so as to position and support said members in assembled relation and leave the body interior readily accessible, stationary electrodes adapted to engage the body members along the joints between the same and an independently movable electrode adjacent each door opening adapted to be brought in contact with the joint within the members whereby different parts of said members may be welded together at the same time.

17. An assembling machine for metal automobile bodies comprising a form to receive the members constituting a complete body and hold them in final assembled position, a stationary electrode adapted to contact said members along the joints between the same, and a plurality of electrodes independently movable in any direction to engage said members at any point to complete a circuit therethrough to the stationary electrode whereby different groups of said members may be welded together at the same time.

18. An assembling machine for metal automobile bodies comprising a cradle to receive the members constituting a complete body and hold them in final assembled position, a relatively stationary electrode adapted to contact one side of the joints between said members, and a plurality of electrodes independently movable in any plane to contact said members at various points along the other side of said joints whereby different pairs of said members may be welded together at the same time.

19. An electric assembling machine for metal automobile bodies having means to position and support in assembled relation the members forming the body, a stationary electrode adjacent the joints between the members, and an electrode freely movable in any direction and adapted to be brought into engagement with said joints at any point along the same to force said members together and into engagement with the stationary electrode to complete an electric circuit through said members to said stationary electrode to weld said members together.

20. A machine for assembling automobile bodies having side members provided with door openings therein, comprising standards adapted to engage the side members adjacent the door openings to position and support said members in assembled relation so that the body interior is readily accessible, a stationary electrode adapted to contact said members along one side of the joints between the same, and a plurality of electrodes movable independently of each other to engage the other side of said joints at various points whereby different pairs of said members may be welded together at the same time.

21. A machine for assembling metal automobile bodies having side members provided with door openings therein, comprising standards adapted to engage the side members adjacent the door openings to position and support said members in assembled relation so that the body interior is readily accessible, a stationary electrode adapted to contact said members along one side of the joints between the same, and an electrode adjacent each door opening freely movable in any plane to contact the other side of said joints whereby different pairs of said members may be readily welded together at any point on the joints therebetween at the same time.

22. A machine for assembling metal vehicle bodies which have side members provided with door openings therein, comprising means for supporting the body members in stationary assembled position, said means including standards adapted to support the side members adjacent the door openings so as to leave the body interior readily accessible, relatively stationary electrodes adapted to contact one side of the joints between said members, and an independently movable electrode adjacent each door opening adapted to engage the adjacent joints at any point to complete a circuit therethrough to weld the members together.

23. An assembling machine for metal vehicle bodies having means to position and support the body members in assembled relation, said means including a stationary electrode adapted to engage the members along the joints to be welded, and a plurality of independently movable electrodes adapted to engage the members to complete an electric circuit therethrough to the stationary electrode whereby several of said members may be welded together at the same time.

24. An electric assembling machine for metal vehicle bodies having an electrode connected to one terminal of an electric circuit to position and support the body members in stationary assembled position, and means connected to another terminal of the electric circuit adapted to be brought into engagement with said members at any one of a plurality of points whereby said members may be welded together at any point along the joint between the same.

25. A vehicle body assembling machine comprising a plurality of standards for receiving and supporting the body members in assembled position, conducting means carried by said standards adapted to engage the joints between the body members, said means being connected to one side of an electric circuit, and a welding terminal connected to the other side of the electric circuit by a flexible cable whereby it may be brought into engagement with the joints at a plurality of points to weld the members together.

26. An assembling machine for vehicle bodies and the like comprising a plurality of standards for receiving and supporting the body members in assembled position, a plurality of relatively stationary conducting bars carried by said standards adapted to engage the body members along certain of the joints to be welded, said conducting bars being connected to one side of an electric circuit, and a welding terminal connected to the other side of the electric circuit by a flexible cable whereby it may be brought into engagement with the body members at any point on the joints to be welded.

27. An assembling machine for vehicle bodies and the like comprising pairs of front, rear, and central standards, a plurality of conducting members carried by said standards adapted to contact the body members along certain of the joints to be welded, conducting bars pivotally mounted on the central standard for engaging certain of the vertical joints to be welded, said conducting members and bars being connected to one side of an electric circuit, and a plurality of welding terminals connected to the other side of the electric circuit by flexible cables whereby they may be brought into engagement with the joints between the body members at any point for welding different groups of said members together at the same time.

28. An assembling machine for vehicle bodies and the like comprising a plurality of supporting standards, a plurality of conducting bars carried by said standards in contact with the joints between the body members, means for clamping the body members to the standards and to the conducting bars to hold said members in accurate assembled position, said conducting bars being connected to one side of an electric circuit, and a plurality of independently movable welding terminals connected to the other side of the electric circuit by flexible cables whereby they may be brought into engagement with the joints to be welded at a plurality of points to complete an electric circuit through the body members to the conducting bars to weld different groups of said members together at the same time.

29. A machine for assembling automobile bodies comprising a form to receive the members constituting a complete body and hold them in final assembled position, electrical welding means for uniting said members together while held in assembled position, and a normally open switch for controlling the circuit of the electric welding means.

30. An assembling machine for automobile bodies comprising means to position and support the body members in assembled relation so as to leave the body interior readily accessible, stationary electrodes adapted to engage the joint between the members, a plurality of electrodes movable in any direction to engage the joints at any point along the same to weld the members together and a normally open switch for controlling the circuit of the electrodes, said switch being provided with actuating means operable from a plurality of points adjacent the automobile body.

31. A machine for assembling automobile bodies having side members provided with door openings therein comprising means for positioning and supporting the body members in assembled relation so as to leave the body interior readily accessible, stationary electrodes adapted to engage the joints between the members, an electrode freely movable in any direction adjacent each of the door openings and a normally open switch for controlling the circuit of the electrodes, said switch being provided with means operable adjacent each door opening.

32. An assembling machine for automobile bodies comprising a cradle to receive the members constituting the body and hold them in assembled position, and a pair of electrodes adapted to contact with opposite sides of the joints between the members, at least one of said electrodes being movable toward the other whereby welding pressure may be exerted upon said joints.

In witness whereof, I have hereunto subscribed my name in the presence of two witnesses.

JOSEPH LEDWINKA.

Witnesses:
A. H. BUXBAUM,
WM. B. READY.